(12) United States Patent
Moya (10) Patent No.: US 7,959,979 B2
(45) Date of Patent: Jun. 14, 2011

(54) METHOD OF FORMING COATED STRUCTURES

(75) Inventor: Wilson Moya, Concord, MA (US)

(73) Assignee: Millipore Corporation, Billerica, MA (US)

( * ) Notice: Subject to any disclaimer, the term of this patent is extended or adjusted under 35 U.S.C. 154(b) by 617 days.

(21) Appl. No.: 11/050,002

(22) Filed: Feb. 3, 2005

(65) Prior Publication Data

US 2005/0191426 A1    Sep. 1, 2005

Related U.S. Application Data

(60) Provisional application No. 60/548,407, filed on Feb. 27, 2004, provisional application No. 60/541,962, filed on Feb. 5, 2004.

(51) Int. Cl.
*B05D 3/02* (2006.01)

(52) U.S. Cl. ............... 427/385.5; 427/333; 427/337; 427/340; 427/352; 427/353; 427/354; 427/379; 427/381; 427/382; 427/412.1; 427/389.9; 427/391; 427/392; 427/394; 427/395; 427/396; 427/407.1; 427/412

(58) Field of Classification Search .................. None
See application file for complete search history.

(56) References Cited

U.S. PATENT DOCUMENTS

| | | | |
|---|---|---|---|
| 3,527,712 A | 9/1970 | Renn et al. | |
| 4,274,985 A | 6/1981 | Szejtli et al. | |
| 4,335,017 A | 6/1982 | Miles et al. | |
| 4,452,892 A | 6/1984 | Rosevear | |
| 4,618,533 A * | 10/1986 | Steuck | 428/315.7 |
| 4,659,474 A * | 4/1987 | Perry et al. | 210/638 |
| 4,675,104 A | 6/1987 | Rai et al. | |
| 4,743,373 A | 5/1988 | Rai et al. | |
| 4,895,661 A | 1/1990 | Capotte | |
| 5,009,759 A | 4/1991 | Serwer et al. | |
| 5,028,337 A * | 7/1991 | Linder et al. | 210/642 |
| 5,075,432 A | 12/1991 | Vanzo | |
| 5,277,915 A | 1/1994 | Provonchee et al. | |
| 5,328,603 A | 7/1994 | Velander et al. | |
| 5,492,723 A | 2/1996 | Sanderson et al. | |
| 5,672,416 A | 9/1997 | Radola et al. | |
| 5,814,372 A * | 9/1998 | Moya | 427/245 |

(Continued)

FOREIGN PATENT DOCUMENTS

EP    0197784    10/1986

(Continued)

OTHER PUBLICATIONS

Wang et al, Analytical Chemistry, 64, pp. 1232-1238, 1992.*

(Continued)

*Primary Examiner* — Erma Cameron (57) ABSTRACT

A process for forming room temperature water soluble polymer coatings on porous substrates by forming a solution of a room temperature water soluble polymer, one or more crosslinkers, a solvent for the room temperature water soluble polymer such as water and optionally one or more porogens, or functional agents, stirring the mixture until all the components are dissolved, adding the solution to a porous structure such as a non-woven fabric or a porous membrane and drying the solution on to the substrate as a coating before subjecting the coating to crosslinking. Alternatively, the coating may be partially crosslinked before drying the solution. Porous structures having a room temperature water soluble polymer coating and being capable of convective flow through the pores of the structure and diffusive flow through the coating can be formed.

22 Claims, 3 Drawing Sheets

Form Dextran Solution

Impregnate Porous Structure

Evaporate Solvent from Solution

Crosslink the Solution

Rinse Out Porogen(s) and Unused Crosslinking Agent(s)

U.S. PATENT DOCUMENTS

| | | | |
|---|---|---|---|
| 5,814,567 A | | 9/1998 | Yahiaoui |
| 5,895,575 A | | 4/1999 | Kraus et al. |
| 5,897,779 A | | 4/1999 | Wisted et al. |
| 5,945,175 A | | 8/1999 | Yahiaoui et al. |
| 6,112,908 A | * | 9/2000 | Michaels ................... 210/506 |
| 6,562,573 B2 | | 5/2003 | Halaka |
| 7,479,222 B2 | * | 1/2009 | DiLeo et al. ............... 210/198.2 |
| 7,479,223 B2 | * | 1/2009 | DiLeo et al. ............... 210/198.2 |
| 2003/0155676 A1 | | 8/2003 | Lubda et al. |
| 2005/0192249 A1 | * | 9/2005 | Moya et al. ................... 514/54 |
| 2005/0220982 A1 | * | 10/2005 | Moya et al. ................ 427/2.11 |

FOREIGN PATENT DOCUMENTS

| | | | |
|---|---|---|---|
| EP | 0328256 | | 8/1989 |
| EP | 0474617 | | 3/1992 |
| EP | 1468723 | | 10/2004 |
| EP | 1470854 | | 10/2004 |
| GB | 2048718 | * | 12/1980 |
| WO | WO 00/44928 | | 8/2000 |
| WO | WO 00/50160 | | 8/2000 |
| WO | WO 03/008078 | | 1/2003 |

OTHER PUBLICATIONS

Valle, et al. "Use of Ceramic Monoligths as Stationary Phase in Affinity Chromatography" Biotechnol. Prog. 2003 19, 921-927.

Svec, "Organic Polymer Support Materials" Chromotographic Science Series 2002 87, 2nd Ed., 17-48.

Hamaker, et al. "Rolled Stationary Phases: Dimensionally Strucured Textile Adsorbents for Rapid Liquid Chromatography of Proteins" Ind. Eng. Chem Res 1999, 38, 865-872.

Eveleigh, et al. "Immunochemical Characteristics and Preparative Application of Agarose-Based Immunosorbents" J. Solid-Phase Biochemistry, 1997, 2(1) 45-78.

Shibusawa, "Surface affinity Chromatography of Human Peripheral Blood Cells" J. Chromoatography, 1999, 722(1-2), 71-88.

Striegel et al. "Molecular Characterization of Polysaccharidces Dissolved in ME2NAC-LICL by Gel-Permeation Chromatography" Carbohydrate Research, 1995, 267(2), 271-290.

* cited by examiner

METHOD OF FORMING COATED STRUCTURES

CROSS REFERENCE TO RELATED APPLICATIONS

This application claims the benefit of U.S. Provisional Application No. 60/548,407, filed on Feb. 27, 2004, and of U.S. Provisional Application No. 60/541,962, filed on Feb. 5, 2004.

BACKGROUND OF THE INVENTION

Typically in the area of chromatographic separations and electrophoresis gels, agarose has been used to make gel media. Typically this has been done by thermally phase separating the polymer from an aqueous solution. This can be done because these polymers have a melting point and a gel point. To process agarose for example, the polymer must be heated above its melting temperature, which is about 92° C., in the presence of water. At that temperature the polymer melts and the molten polymer is then solvated by water to form a solution. The polymer remains soluble in water as long as the temperature is above the polymer's gel point, which is generally above 30° C., more typically about 43° C. At and below the gel point, the polymer phase separates and becomes a hydrogel that takes on whatever shape the solution was in just before gelling. Additionally, as the agarose approaches its gel point, the viscosity of the solution becomes higher as the hydrogel begins to form.

For agarose beads, such as are used in chromatography media, the heated solution is kept above its gel point and it is stirred into an immiscible, heated fluid such as mineral or vegetable oil to form beads. The two-phased material (beads of agarose in the immiscible fluid) is then cooled and the beads are recovered. The beads can then be used as is for size exclusion chromatography or further processed by crosslinking, addition of various capture chemistries such as affinity chemistries or ligands, positive or negative charge, hydrophobicity or the like or combinations of crosslinking and chemistries.

Some have tried to use agarose to form a coating on or in a structure rather than as a solid article itself. For instance, according to Cerro et al., Biotechnol. Prog 2003, 19 921-927 (Use of ceramic monoliths as stationary phase in affinity chromatography), thin, surface active only agarose coatings on ceramic monoliths were created by impregnating the monolith with the traditional hot solution of agarose, followed by removal of excess hot agarose solution from the cells within the monolith using compressed air and subsequently cooling the monolith to gel the agarose coating.

One of the major problems with this coating process is that the coatings are difficult to effect on porous materials. In the article mentioned above, the agarose had to be applied in a heated state (thus requiring a substrate that is heat stable). A further problem is that only thin coatings that have only surface activity can be created. In part this may be due to the method used for removing excess agarose. It may also be a function of the agarose gel point and the higher viscosity that occurs as the temperature of the agarose approaches the gel point. Moreover the prior art process is very difficult if not impossible with substrates having pores that are relatively small in comparison to the cell size of the monoliths of the prior art. The reason for these difficulties is that in some cases, air cannot be readily forced through certain porous materials without disrupting or otherwise damaging the porous structure, as is the case with certain fabrics or porous membranes. Therefore relatively porous, rigid monolithic structures must be used.

WO 00/44928 suggests forming a temperature stable agarose solution through the use of high levels (e.g. 8M) of chaotropes such as urea. Agarose of this invention is imbibed into a porous support to form a continuous phase. Water is carefully added such that a thin gel layer forms at the interfaces between the agarose solution and the added water. The gel layer prevents migration of the agarose but allows further migration of the water and urea molecules out of the agarose solution into the added water. This process continues until the agarose solution turns into a gel within the interstices of the pores of the porous substrate.

One major problem with this prior art method is that the process by which it is made causes the pores of the substrate to be substantially blocked, severely limiting convective flow through the porous support.

What is desired is a method for making coatings of room temperature water-soluble polymers on porous substrates. More particularly, what is desired is the ability to create room temperature water soluble polymer based coatings on relatively small pored, porous substrates (0.01-1000 microns pore size) that allows for good convective flow through the porous structure with diffusive flow within the room temperature water soluble polymer coating itself.

By using the method of the present invention, a relatively thick, porous room temperature water soluble polymer coating on porous substrates can be achieved easily, including the surface of porous materials that are capable of both convective and diffusive flows.

SUMMARY OF THE INVENTION

The present invention relates to a method of making coated structures using a room temperature water-soluble polymer as the coating. More particularly, it relates to making room temperature water-soluble polymer coatings, such as absorptive or chromatographic coatings on porous substrates.

Using the methods of the present invention one can coat the surfaces of any substrate, including irregular materials such as porous materials, including the interior surfaces, with a layer of the room temperature water-soluble polymer without substantially blocking the pores with the room temperature water-soluble polymer so as to allow for convective flow through the porous structure. Additionally, the coating of room temperature water-soluble polymer is thick enough to allow for diffusive flow to occur within the room temperature water-soluble polymer layer itself.

In one embodiment of the present invention, a solution of room temperature water soluble polymer such as dextran is formed by adding one or more crosslinking agents, optionally one or more porogens, wetting agents and/or ligands to a solvent for the room temperature water soluble polymer, in this example dextran, such as water at about room temperatures (68° F. or 20° C.). The room temperature water-soluble polymer is coated onto a preformed structure such as a porous substrate and the solvent is evaporated. The room temperature water-soluble polymer is then crosslinked by heating the coated substrate at a temperature and for a time sufficient to substantially crosslink the polymer. The porogen if used is then removed. In this embodiment, the optional use of wetting agents such as surfactants helps in forming relatively uniform and continuous coatings.

In another embodiment of the present invention, a solution of room temperature water-soluble polymer is formed by adding one or more crosslinking agents, optionally one or more porogens, wetting agents and/or ligands to a solution of the polymer in water at about room temperatures (68° F. or 20° C.). The polymer is then coated onto a preformed structure such as a porous substrate. The room temperature water-soluble polymer is partially crosslinked either by heating the coating at a temperature and for a time sufficient to only partially crosslink the polymer or by simply allowing the coating to sit at room temperature for period of time sufficient to allow the partial crosslinking to occur. The solvent is then evaporated. The polymer is then fully crosslinked by either heating the coated substrate at a temperature and for a time sufficient to substantially crosslink the polymer or by simply allowing the coating to sit at room temperature for period of time sufficient to allow the crosslinking to occur. The porogen, if used, is then removed. In this embodiment, the optional use of wetting agents such as surfactants helps in forming relatively uniform and continuous coatings.

DETAILED DESCRIPTION OF THE INVENTION

The present invention relates to a method of forming a room temperature water-soluble polymer structure such as a coating on a porous substrate such that the substrate retains at least 20% of its initial void volume and porosity.

Figure 1:
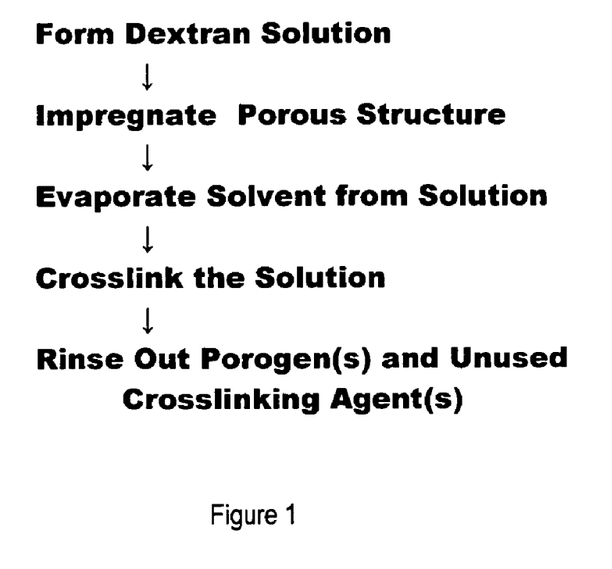
FIG. 1 shows an embodiment of a process according to the present invention.
Figure 2:
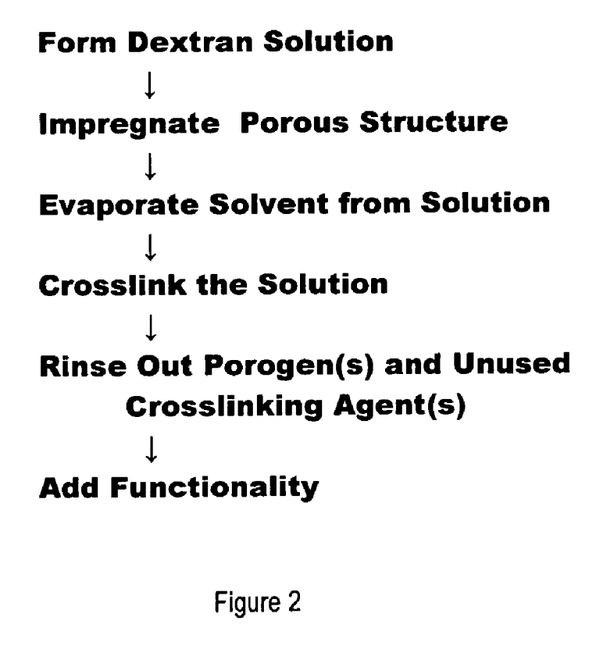
FIG. 2 shows another embodiment of a process according to the present invention.

FIG. 1 shows a first embodiment of the process in block diagram fashion. The process comprises the steps of a) forming a room temperature water soluble polymer solution in a solvent for it, such as water, and adding one or more crosslinkers and porogens, b) wetting a porous substrate with that solution, optionally removing excess solution, c) evaporating the solvent from the solution to cause the coating to conform to the surfaces of the substrate, d) causing the one or more crosslinkers to substantially crosslink the room temperature water soluble polymer and e) rinsing the coated substrate to remove the porogens and unused crosslinker. Additionally, optional steps include adding functionality to the surface of the coating as shown in FIG. 2.

Figure 3:
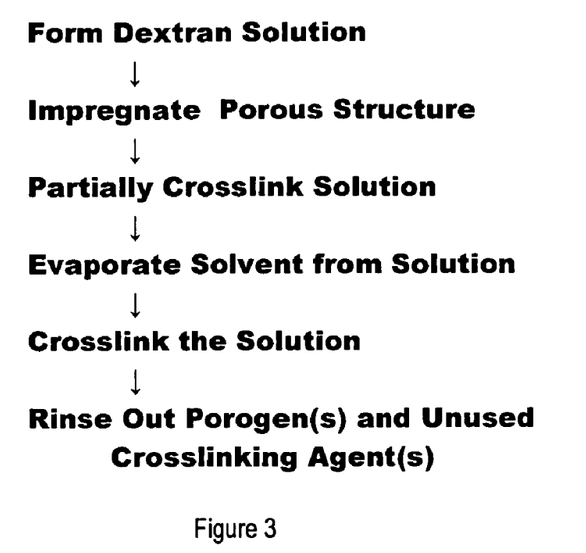
FIG. 3 shows a further embodiment of a process according to the present invention.
Figure 4:
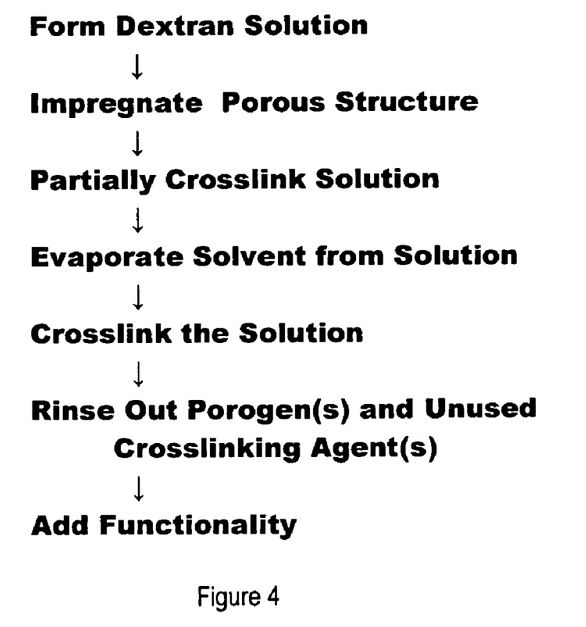
FIG. 4 shows an additional embodiment of a process according to the present invention.

FIG. 3 shows another embodiment of the process in block diagram fashion. The process comprises the steps of a) forming a room temperature water soluble polymer solution in a solvent such as water, preferably containing one or more crosslinkers and porogens; b) wetting a porous substrate with that solution, optionally removing excess solution; c) causing the solution to only partially crosslink, d) evaporating the water from the solution to cause the coating to conform to the surfaces of the substrate, e) causing the coated substrate to substantially crosslink the room temperature water soluble polymer and f) rinsing the coated substrate to remove the porogens and unused crosslinker. Additionally, optional steps include adding functionality to the surface of the coating as shown in FIG. 4.

The solution of the above-preferred processes is formed of room temperature water-soluble polymer, water and/or other solvents for the room temperature water-soluble polymer, one or more crosslinking agents for the room temperature water-soluble polymer and optionally one or more porogens for the coating material.

The room temperature water-soluble polymer, water or other solvent, crosslinkers and optional porogens are preferably mixed at or around room temperature. As room temperature water soluble polymers for the most part are easily dissolvable in water, little or no heat is required, but it made be used if desired to speed the process so long as it is low enough to avoid any premature crosslinking initiation from occurring. One may complete this in one step by combining all the components together. Alternatively, one can first add the room temperature water-soluble polymer to a solvent such as water and dissolve the room temperature water-soluble polymer. The crosslinkers and porogens can then be added.

If the solution is heated, it is then preferably allowed to cool.

One may allow this cooling to occur naturally or one may, if desired, affirmatively cool the solution. At room temperature, the solution is a stable, non-gelled solution.

The type of room temperature water-soluble polymer used will be determined by the properties desired of the final coating. Dextran, substituted celluloses, low or room temperature gel point agaroses, polyvinyl alcohols (PVA) and the like are typical examples of such polymers. The solution is made so that the final concentration of room temperature water soluble polymer is between about 0.1% to about 20%, preferable between about 1% to about 10%, more preferably between about 2% to about 6%, by weight of total final solution.

While water is the preferred solvent for the room temperature water-soluble polymer, a minor amount, up to 20% by weight of the dissolving solution, of co-solvent may be added to improve solubility of the room temperature water-soluble polymer. Examples of suitable co-solvents are dimethylacetamide or dimethylsulfoxide. Others are known to those skilled in the art.

The coating may be crosslinked by any of the chemistries commonly used in the industry to crosslink materials containing multiple hydroxyl groups, such as dextran, these chemistries being as non-limiting examples, epichlorohydrin or other multifunctional epoxy compounds, various bromyl chemistries or other multifunctional halides; formaldehyde, gluteraldehyde and other multifunctional aldehydes, bis(2-hydroxy ethyl)sulfone, dimethyldichloro-silane, dimethylolurea, dimethylol ethylene urea, diisocyanates or polyisocyanates and the like.

Porogens may be used in the present invention although it has been found that the solvent, especially water, will act as a porogen in the present invention. Preferably however other porogens are used as they allow one greater latitude and control over the pore formation and size of the pores in the coating. Suitable porogens can be formed from one or more water-soluble polymers, which include by way of examples, polyvinyl pyrrolidone, polyvinyl alcohol, polyethylene glycols, and water-soluble polyacrylamides, including substituted polyacrylamides, such as polydimethylacrylamide. These polymers are believed to act as "porogens" in that they control the amount of volume of the coating that is freely permeable to dissolved solutes when the coated porous substrate is in use.

These porogens can be used as blends with the room temperature water-soluble polymer in the initial dissolution step, or they can be dissolved in the solution after the formation of the solution, but before its application. Care must be taken not to add an excessive amount of porogen, as coagulation of the solution may occur. Ratios of porogen to room temperature water-soluble polymer of from about 0.1 to 10 are possible. Preferred porogens are polyvinyl alcohol and polyacrylamides.

By being water soluble, these porogens are also easily removed at the end of the process by a water bath or rinsing step.

Non-water soluble porogens may also be used if desired so long as the solvent or extraction liquid used to remove the porogen does not adversely affect the room temperature water-soluble polymer coating.

In forming a coating for a porous substrate, following the formation of the solution, a porous substrate is then chosen.

The substrate may be a fiber, a sheet such as a woven fabric, a non-woven, a mat, a felt or a membrane or it may be a three dimensional structure such as a sponge, poly(HIPES) or other monolithic structure such as a honeycomb, or a porous bead such as a controlled pore glass, porous styrene beads, silica, zirconia and the like. Preferably, the substrate is sheet formed of a woven or non-woven fabric or a membrane.

Non-woven fabrics are flat, porous sheets made directly from separate fibers bonded together by entangling fiber or filaments, thermally or chemically. Typically, nonwoven fabric manufacturers supply media having from 1 to 500 micron mean flow pore (MFP) ratings. For non-woven fabrics, the porous structure is the entangled fibers, and porosity refers to the tortuous spaces between and among the fibers. Porosity has a similar meaning for felted fabrics. A preferred nonwoven is by Freudenberg Nonwovens NA of Lowell, Mass. and is type FO2463.

Woven fabrics are produced by the interlacing of warp fibers and weft fibers in a regular pattern or weave style that is at some predefined angle to each other. Typically the weft is at an angle of about 90 degrees to that of the warp. Other commonly used angles include but are not limited to 30, 45, 60 and 75 degrees. The fabric's integrity is maintained by the mechanical interlocking of the fibers cause by the weaving process. Drape (the ability of a fabric to conform to a complex surface), surface smoothness and stability of a fabric are controlled primarily by the weave style, such as plain, twill, satin, basket weave, leno, etc. In this case, the substrate porosity is the space between the fibers and is of a less tortuous nature.

Monoliths are blocks of porous material. They can be rectangular, cylindrical, or foamed into other shapes. Examples are ceramic monoliths, which are ordered structures of packed rectangular or triangular capillaries. These are supplied by Engelhard, Inc. of Huntsville, Ala. and Corning Inc of Corning, N.Y. One form of polymeric monoliths is made from sintered plastic particles by Porex Corporation of Fairburn, Ga.

Poly(HIPES) [high internal phase emulsion] materials are mechanically stable isotropic, open celled polymeric foams. These, and other macroporous polymer structures are described in "Porous polymers and resins for biotechnological and biomedical applications" H.-P. Hentze and M. Antonietti Reviews in Molecular Biotechnology 90 (2002) 27-53.

The substrate may be formed from a variety of materials including glass, plastics, ceramics and metals.

Borosilicate glass is one example of a suitable glass. It can be formed as a glass mat or sintered porous beads formed into a sheet, such as the controlled pore glass beads available from Millipore Corporation of Billerica, Mass.

Various ceramics based on the more conventional silicate chemistries or more exotic chemistries such as yttrium, zirconia, titanium and the like and blends thereof can be used. They can be formed into fibers, mats, felts, monoliths or membranes.

Metals include sintered sheets and structures, such as sintered stainless steel or nickel filters, woven screens and nonwoven mats, fabrics and felts such as stainless steel wool.

The preferred substrate is made from plastic, more preferably thermoplastics. Preferred thermoplastics include but are not limited to polyolefins such as polyethylene, polypropylene, sheathed polyethylene/polypropylene fibers: PVDF, polysulfones, polyethersulfones, polyaryllsulfones, polyphenylsulphones, polyvinyl chlorides, PET and polyamides.

The room temperature water-soluble polymer solution can be used, as is, for coating. It is preferable to add coating modifying materials to the solution in order to modify and control the structure and properties of the final coating.

One class of coating modifying materials comprises volatile organics, miscible with the solution. Examples are monohydric alcohols such as methanol, ethanol, and propanols. These can be used up to concentrations that give a slightly cloudy solution. Higher amounts of these alcohols can cause precipitation of the room temperature water-soluble polymer. Preferred amounts are equi-volumetric with the water in the solution, more preferred is to add the alcohols to about 40% to about 60% of the water. A preferred alcohol is methanol. Miscible ketones such as acetone can also be used, but care must be used, as the solubility of room temperature water-soluble polymer is less in ketone-water mixtures. Any mixture of two or more of these materials is also contemplated.

Another class of coating modifying materials comprises non-volatile miscible organics. Non-limiting examples of these included glycerine, ethylene glycol, methyl pentane diol, diethylene glycol, propylene glycol, triethylene glycol, the methyl, ethyl, or n-butyl ethers of ethylene glycol, the dimethyl or diethyl ethers of ethylene glycol, ethylene glycol dimethyl ether acetate ethylene glycol diethyl ether acetate, diethylene glycol methyl ether, diethylene glycol ethyl ether, diethylene glycol n-butyl ether, diethylene glycol dimethyl ether, diethylene glycol diethyl ether, diethylene glycol dimethyl ether acetate, diethylene glycol diethyl ether acetate, N-methyl morpholine, N-ethyl morpholine, and the like. Polyethylene glycols of low molecular weight are also examples of materials that are in this class. Any mixture of two or more of these materials is also contemplated.

To obtain optimum coatability of the solution, one or more surfactants can be added to the solution. Each combination of solution type and substrate will require some experimentation to determine the optimum type of surfactant. Anionic surfactants have been found to be useful, with anionic fluorosurfactants being preferred. Of these, 3M FC-99 and FC-95 or equivalents from other suppliers are most preferred. These are preferably present in amounts ranging from about 0.001 to about 10%, preferably from about 0.01 to about 5% by total weight of the solution.

The substrate is impregnated with the coating such as soaking the substrate in a bath of the coating, applying the coating material by a doctor blade, spray nozzle, curtain coater, roll coater, extrusion coater or any other method known to one of ordinary skill in the art to apply a coating to a porous substrate. Excess coating material is removed such as by blotting or shaking the coated substrate, squeezing such as through a nip roller, scraping the surface of the coated substrate or by blowing air or a gas at the substrate's surface.

The solvent for the coating is then at least partially removed by evaporation. Preferably, the solvent is water and it is removed by a controlled evaporation such that the coating evaporates relatively uniformly throughout the entire substrate. The use of heat warmed air (preferably between 20 and 50° C., (preferably below the temperature at which the crosslinker will begin to cause rapid crosslinking of the polymer); microwave drying, vacuum oven drying and the like to control and/or sped evaporation may be used if desired. This causes a room temperature water-soluble polymer coating to be formed on the substrate surfaces that is dry to the touch, but still contains some residual moisture within it.

The coated substrate is then preferably subjected to heating (typically from about 70 to 95° C. depending on the selected crosslinking agent) in order to cause the crosslinking of the room temperature water-soluble polymer. Alternatively, the crosslinking will occur on its own over time at room temperature. If so desired one can simply leave the coated substrate out at room temperature and allow the crosslinking to occur.

The coated substrate is then rinsed with water and or other liquids that remove the porogen (if any) and unused crosslinking agents (if any). This rinsing step is generally done at temperatures between about 15° C. and about 50° C., preferably between 20° C. and 50° C. The coated substrate will have at least a portion of all of its surfaces (facial and interior surfaces) covered with a coating that is permeable to biomolecules. Preferably the coating is relatively uniformly applied to the substrate. More preferably, substantially all of the surfaces are covered by the coating. Also preferably, the coating is of relatively uniform thickness throughout the substrate.

The coating may then have one or more functionalities attached to it, including ligands, such as Protein A or Protein G, natural or recombinatorily derived versions of either, modified versions of protein A or G to render them more caustic stable and the like, various chemical ligands such as 2-aminobenzimidazole (ABI), aminomethylbenzimidazole (AMBI), mercaptoethylpyridine (MEP) or mercaptobenzimidazole (MBI), or various chemistries that render the coating cationic, anionic, philic, phobic or charged, as is well-known in the art of media formation.

Functional groups used in liquid chromatography that are adaptable to the present invention include groups such as, but not limited to, ion exchange, bioaffinity, hydrophobic groups, groups useful for covalent chromatography, thiophilic interaction groups, chelate or chelating groups, groups having so called pi-pi interactions with target compounds, hydrogen bonding, hydrophilic groups, etc.

Figure 5:
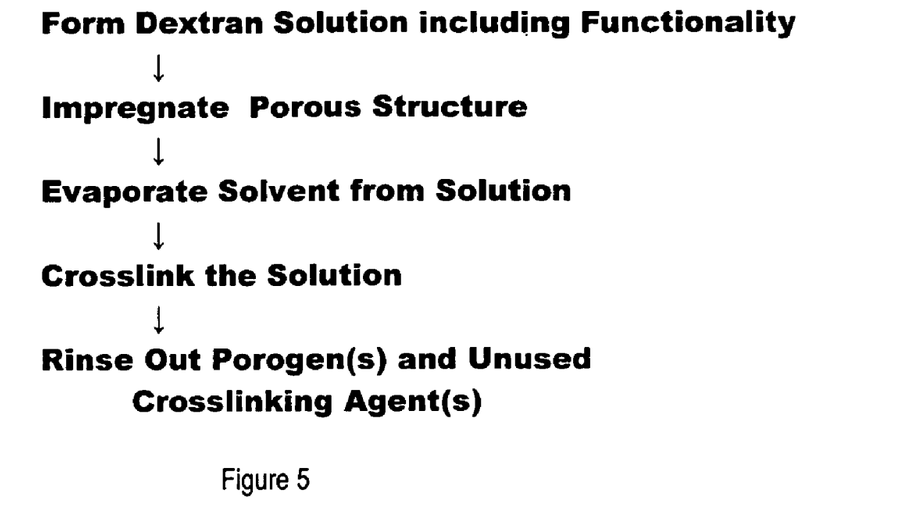
FIG. 5 shows a further embodiment of a process according to the present invention.
Figure 6:
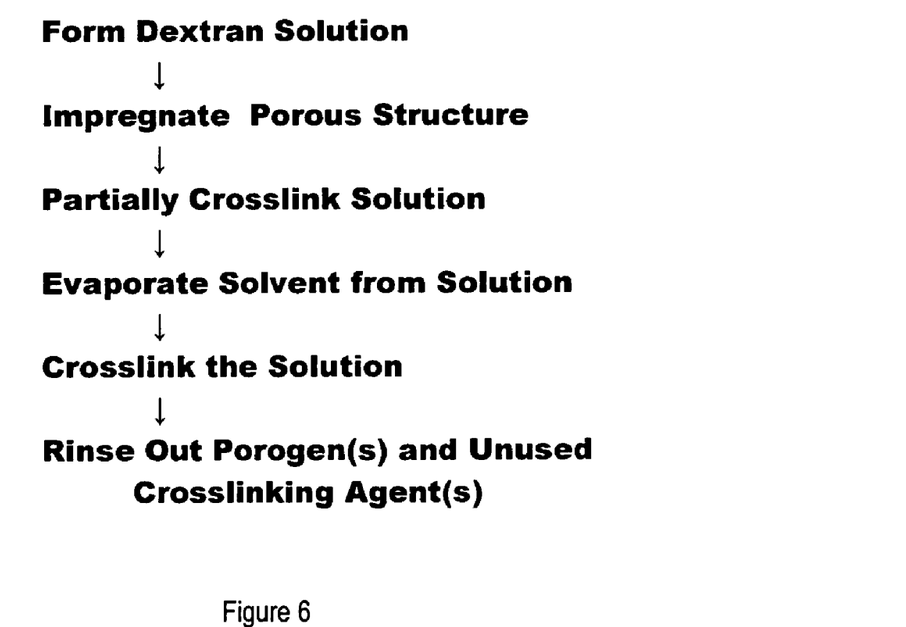
FIG. 6 shows an additional embodiment of a process according to the present invention.

These groups may be added after the coating has been applied and crosslinked to the substrate or they may be added to the initial solution and utilize the crosslinking to bind them to the coating as well (as shown in FIGS. 5 and 6).

The media can then be placed into a holder and have a liquid stream (containing one or more desirable components capture in it) run through the media so that the desired components are separated from the rest of the liquid. Typically, it is the desired components that are captured from the liquid and the rest of the liquid including impurities passes through. Alternatively, the desired components may pass through and impurities can be captured by the media. The media is washed to remove any unbound materials and then the captured material is eluted using a change in ionic strength, pH or the like.

If desired or required, one may apply a second or even more coating layers to the first in order to reach the desired thickness of coating(s) and the like.

The substrate, even with the coating(s), has high permeability and good flow and capacity characteristics. The substrate is self-supportive and provides a platform or structural network for the coating(s).

It is preferred that the substrate selected be highly porous, so that there is minimal, but sufficient wall or solid material within it to provide the structural integrity and high porosity and flow. The pore sizes may vary from about 0.01 to about 1000 microns, preferably 10 to 300 microns, more preferably from about 30 to about 200 microns and more preferably from 30 to 100 microns, depending upon the fluid and the constituent that is desired to be captured from it. For example, in an application to capture a desired protein from an unclarified, lysed cell broth, the pores of the substrate should be sufficiently large enough to allow good permeability at high flow rates of the broth through the substrate while still allowing for a high level of capture on a single pass, such as greater than 50%. In the above application a pore size of from about 100 to about 300 microns would be preferred. In an application starting with clarified or clean feedstreams, the pore size can be smaller, from about 30 to about 60 microns. For laboratory devices such as syringe filters, or microtiter plates, which are used with a variety of solution conditions, smaller pores are preferred when clean, very dilute solutions are used. These pores are from about 0.1µ to about 10µ.

The coating(s) themselves are also porous in nature so that they are permeable to biomolecules. Preferably they are capable of absorbing biomolecules within their bulk, namely within the pores formed within the coating(s). The coating(s) are thick enough to create these pores and have some diffusional flow into them, thereby increasing overall capacity of the structure above that of the surface alone and in some applications selectivity of the capture, but they are sufficiently thin so that the diffusion length is limited and not a negative factor in performance either in capturing or releasing the biomolecules.

The coating(s) typically constitute at least 1% of the total volume of the coated substrate. Preferably they are from about 5% to about 80% of the total volume of the coated substrate.

By another measure, on average, the coatings reduce the average diameter of the substrate pores by an amount from about 1% to about 80%, preferably from about 10% to about 50%, more preferably from about 20% to about 50% from that of the uncoated substrate.

By another measure, the coatings reduce the permeability of the substrate by an amount from about 5% to about 80% of that of the uncoated substrate.

Another method for determining the amount of coatings used is fractional porosity, which is important for ensuring the flow through the coated substrate. Fractional porosity is the ratio of volume within the coated substrate that is available to the solution being processed to the total volume of the coated substrate. A higher fractional porosity gives a higher inherent flow capacity to the coated substrate. For the coated substrates of the present invention, preferred fractional porosities are from about 0.35 to about 0.55.

The coating(s) are generally from about 1 to 100 microns in thickness, preferably from about 2 to about 20 microns in thickness and more preferably from about 5 to about 15 microns in thickness.

The diameters of pores of the coating(s) may vary within the range of those commonly used in chromatography or from about 1 to about 200 nanometers, preferably from about 1 to about 100 nanometers, more preferably from about 1-50 nanometers. They should be of a size sufficient to allow for the passage or permeation of the desired material into them, such as proteins or other biomolecules or synthetic molecules such as oligonucleotides and the like.

In a preferred embodiment the coating covers the surfaces of the substrate to a substantially uniform thickness. To accomplish requires routine trials in which the coating solution viscosity, substrate pore size, method of removing excess solution and drying procedures are optimized to obtain this end. In general, a practitioner, once aware of the teachings of this invention will determine an approximate coating thickness that will optimize capacity and absorption and release rates for the desired solute. He will then choose a substrate with pore size and porosity such that this thickness will not overly reduce flow. Routine trial and error experimentation, based on the teachings of the present invention, will provide a skilled practitioner a route to the correct formulation and drying method.

In a preferred embodiment, substantially all surfaces are covered with the porous coating, preferably of a uniform thickness.

The structure of the present invention has good permeability. Permeability is generally defined as the ratio of flow of a fluid to the pressure applied to it. The present invention has inherent flow even at relatively low pressure (1 psi) and has a stable flow at relatively high flow rates such as 300 ml/hr or greater. Preferably, it has a relatively linear permeability rate over a range of pressures from about 1 ml/hr to about 500 ml/hr.

The structure also has good capacity. Generally, this means there is a relatively high surface available to be in direct contact with the fluid flowing through the structure as compared to the surface area of the underlying substrate. Typically, a structure according to the present invention has a surface area that is at least 25%, preferably, 50% and preferably 75% higher than the surface area of the substrate itself more so that it is capable of increased breakthrough capacity for the captured materials and allows for faster mass transport (diffusional transport).

Using the room temperature water-soluble polymer solutions and processes of the present invention, coatings of the polymer on any surface, including the surfaces of irregular materials such as porous materials, can be affected by applying the solution to the surface of the article followed by the removal of the solvent by evaporation and then crosslinking. After the formation of the coating is achieved, the porogens and unused crosslinker can be removed such as by extraction with a liquid composition.

The following example illustrates the essence of the present invention.

Example 1

Dextran Coating Solution Formation

A polyolefin non-woven fabric having a pore size of about 100 microns and a porosity of about 65% was coated with dextran according to the following procedure. A coating solution was prepared containing 15 g dextran (500,000 MW), 1 g polyethylene glycol diglycidyl ether as a crosslinker, 20 g polyacrylamide solution (10% in water) as a porogen, 1.5 g 1N sodium hydroxide and 62.5 g water. The non-woven fabric was exposed to the above dextran coating solution such that the fabric was completely wetted by the solution. The wet fabric was then placed between two sheets of polyethylene film and squeezed gently to remove excess solution from the surface of the fabric; the fabric was then removed from the film sheets and allowed to dry at room temperature. The dry, coated fabric was then placed in an oven at 85° C. for 4 hours to effect crosslinking of the dextran. The coated fabric was then rinsed in water several times to remove any unreacted materials, including the polyacrylamide. The coated fabric was kept in water.

Example 2

Functionalization of Crosslinked Dextran Coating With Sulfopropyl (SP) Groups

The crosslinked dextran coated fabric of example 1 was immersed in a solution containing 6 grams of sodium bromopropanesulfonate 94 grams of 1M sodium hydroxide, the temperature of this solution was then raised to 50° C. and the functionalization reaction was allowed to proceed at this temperature for 16 hours under gentle agitation. The sulfopropyl functionalized coated fabric was rinsed with water several times to remove excess reactants and base; the fabric was kept in water. The permeability of the modified fabric was measured to be 1.78 $cm^2$/min-psi in a sodium acetate buffer at pH 4.5 and conductivity of 8 mS.

Example 3

Protein Binding of SP Functionalized a Dextran Coated Fabric

A 13 mm disk of the SP functionalized dextran coated fabric from example 2 was immersed in 6 ml of phosphate buffer at pH 7, conductivity of 2 mS and containing lysozyme in a concentration of 1 g/L, the fabric was allowed to remain in contact with the protein solution for 16 hours at room temperature under agitation. After 16 hours, the concentration of lysozyme in the protein solution was measured and the amount of protein bound to the fabric was calculated based on the volume of the 13 mm disk of fabric. The protein binding capacity of the fabric was measured to be 28 mg lysozyme/ml fabric.

Example 4

Crosslinked Agarose Coating

Six grams of agarose powder (type XII, obtained from Sigma-Aldrich) were added to 40 grams of water, the mixture was agitated while heating at a temperature of 95° C. until an initial agarose solution was formed. This initial free flowing solution was cooled to room temperature, at which point the solution became a gel having no free flowing characteristics at all. To this gel, 15 grams of zinc chloride were added and the mixture was heated again to 95° C. while agitating until the gel and the salt dissolved to form a homogeneous solution. This solution was then cooled to room temperature, the solution's free flowing characteristics were retained at this temperature. The pH of the cooled solution was adjusted to pH 10-14 with NaOH or other base. A suitable crosslinking compound, such as any of the chemistries commonly used in the industry to crosslink materials containing multiple hydroxyl groups, such as agarose, these chemistries being as non-limiting examples, aqueous solution soluble crosslinkers including epichlorohydrin or other multifunctional epoxy compounds, preferably 1,4-butanediol diglycidyl ether or ethylene glycol diglycidyl ether, various bromyl chemistries or other multifunctional halides; formaldehyde, gluteraldehyde and other multifunctional aldehydes, bis(2-hydroxy ethyl)sulfone, dimethyldichloro-silane, dimethylolurea, dimethylol ethylene urea, diisocyanates or polyisocyanates. The crosslinker is added to about 5% concentration. To this solution, 39.9 grams of methanol and 0.1 grams of Fluorad FC-95 fluorosurfactant (3M Company) were added while mixing to form the final agarose solution. This final solution remained liquid at room temperature.

A polyolefin non-woven fabric having a pore size of about 100 microns and a porosity of about 65% (Type FO2463 from Freudenberg Nonwovens NA of Lowell, Mass.) can be coated according to the following procedure. A coating solution prepared as above is used. The non-woven fabric was exposed to the above coating solution such that the fabric was completely wetted by the solution. The wet fabric was then placed between two sheets of polyethylene film and squeezed gently to remove excess solution from the surface of the fabric; the fabric was then removed from the film sheets and allowed to dry at room temperature. The dry, coated fabric was then placed in an oven at 85° C. for 4 hours to crosslink the agarose. The coated fabric was then rinsed in water several times to remove any unreacted materials. The coated fabric was kept in water.

The invention claimed is:

1. A method of forming a porous crosslinked polymer coated substrate comprising the steps of
    a) providing one or more room temperature water soluble polymer materials, a solvent for the room temperature water soluble polymer, one or more crosslinking agents selected from the group consisting of multifunctional epoxy compounds, multifunctional bromyl compounds, multifunctional halides, multifunctional aldehydes, bis (2-hydroxy ethyl)sulfone, dimethyldichloro-silane, dimethylolurea, dimethylol ethylene urea, diisocyanates, polyisocyanates and mixtures thereof for the room temperature water soluble polymer, and a porous substrate;
    b) adding the room temperature water soluble polymer, solvent and one or more crosslinking agents together as a mixture;
    c) stirring the mixture for period of time sufficient to dissolve all the components and form a room temperature water soluble polymer solution,
    d) applying the room temperature water soluble polymer solution onto the porous substrate;
    e) evaporating the solvent from the room temperature water soluble polymer solution on the substrate below the temperature at which the cross linking agent causes crosslinking of the polymer materials to form a porous dry room temperature water soluble polymer coating on the substrate;
    f) heating the porous dry room temperature water soluble polymer coating at a temperature of about 70° to 95° C. causing the cross linking agent to crosslink the water soluble polymer coating on the substrate, resulting in a porous cross-linked polymer coated substrate; and
    g) rinsing the porous crosslinked polymer coated substrate to remove any residual one or more crosslinking agents from the crosslinked polymer coated structure.

2. The method of claim 1 further comprising a step between (c) and (d) of causing the partial crosslinking of the coating solution by a method selected from the group consisting of heating the solution for a time and at a temperature sufficient to partially crosslink the room temperature water soluble polymer solution and allowing the coating to remain at room temperature for a time and at a temperature sufficient to partially crosslink the room temperature water soluble polymer solution.

3. The method of claim 1 further comprising step (h) subjecting the coated substrate to additional processing steps.

4. The method of claim 1 further comprising step (h) subjecting the coated substrate to additional processing steps of surface attachment of one or more chemistries.

5. The method of claim 1 wherein one or more porogens are added to the solution in step (b), the one or more porogens being selected from the group consisting of polyvinyl pyrrolidone, polyvinyl alcohols, polyethylene glycols, polyacrylamides, substituted polyacrylamides and mixtures thereof.

6. The method of claim 1 wherein the solvent for the room temperature water soluble polymer is selected from the group consisting of water and aqueous solutions, and the room temperature water soluble polymer is selected from the group consisting dextran, celluloses, and agaroses.

7. A method of forming a chromatographic or adsorbent porous crosslinked polymer coating on a porous substrate comprising the steps of:
    a) providing a room temperature water soluble polymer, a solvent for the room temperature water soluble polymer, one or more crosslinking agents for the room temperature water soluble polymer, and one or more porogens for the room temperature water soluble polymer;
    b) forming a room temperature water soluble polymer solution of the room temperature water soluble polymer, a solvent for the room temperature water soluble polymer, one or more crosslinking agents for the room temperature water soluble polymer, and one or more porogens for the room temperature water soluble polymer by stirring;
    c) providing a porous substrate;
    d) wetting the porous substrate with the room temperature water soluble polymer solution so as to coat substantially all surfaces of the porous substrate;
    e) evaporating the solvent from the room temperature water soluble polymer solution at a temperature below which the cross linking agent causes crosslinking of the polymer to form a porous dry room temperature water-soluble polymer coating on the surface of the porous substrate;
    f) subjecting the porous dry room temperature water-soluble polymer coated substrate to crosslinking by heating the coated substrate to a temperature and for a period of time sufficient to cause the crosslinking of the porous dry room temperature water soluble polymer coating by the one or more crosslinking agents, resulting in a porous cross-linked polymer coated substrate; and
    g) rinsing the porous cross-linked polymer coated substrate to remove any residual one or more crosslinkers and the one or more porogens from the porous cross-linked polymer coated porous substrate.

8. The process of claim 7 wherein the solution further comprises one or more surfactant wetting agents.

9. The process of claim 7 further comprising a step between (d) and (e) of partially crosslinking the solution after coating it on to the substrate by a method selected from the group consisting of heating the solution for a time and at a temperature sufficient to partially crosslink the room temperature water soluble polymer solution and allowing the coating to remain at room temperature for a time and at a temperature sufficient to partially crosslink the room temperature water soluble polymer solution.

10. The process of claim 7 wherein the one or more porogens is selected from the group consisting of polyvinyl pyrrolidone, polyvinyl alcohols, polyethylene glycols, polyacrylamides, substituted polyacrylamides and mixtures thereof.

11. The process of claim 7 wherein the one or more crosslinking agents is selected from the group consisting of multifunctional epoxy compounds, multifunctional bromyl compounds, multifunctional halides, multifunctional aldehydes, bis(2-hydroxy ethyl dimethyldichloro-silane, dimethylolurea, dimethylol ethylene urea, diisocyanates, polyisocyanates and mixtures thereof.

12. The process of claim 7 further comprising the step of applying a functional chemistry to the porous crosslinked polymer coating prior to step (g).

13. The process of claim 7 further comprising step (h), which occurs after step (g), applying a functional chemistry to the porous crosslinked polymer coating wherein the functional chemistry is selected from the group consisting of chemical ligands and protein ligands.

14. The process of claim 7 wherein the porous substrate is selected from the group consisting of woven fabrics, non-woven fabrics, felts, mats, fibers, open-pored sponges, porous monoliths and porous membranes.

15. The process of claim 7 wherein the solvent is evaporated by air movement at a temperature between 20 and 50° C.

16. The process of claim 7 wherein the solvent is evaporated by air movement at a temperature above room temperature.

17. A method of forming a chromatographic or adsorbent porous crosslinked polymer coating on a porous substrate comprising the steps of:
  a) providing a room temperature water soluble polymer selected from the group consisting dextran, celluloses, and agaroses, a solvent for the room temperature water soluble polymer selected from the group consisting of water and aqueous solutions, one or more crosslinking agents for the room temperature water soluble polymer, and one or more porogens for the room temperature water soluble polymer;
  b) forming a room temperature water soluble polymer solution of the room temperature water soluble polymer, a solvent for the room temperature water soluble polymer, one or more crosslinking agents for the room temperature water soluble polymer, and one or more porogens for the room temperature water soluble polymer by stirring;
  c) providing a porous substrate having a pore size from about 10 to about 300 microns;
  d) wetting the porous substrate with the room temperature water soluble polymer solution so as to coat substantially all surfaces of the porous substrate;
  e) causing the room temperature water soluble polymer solution to partially crosslink on the porous substrate;
  f) evaporating the solvent from the partially crosslinked room temperature water soluble polymer solution at a temperature below which the cross linking agent causes crosslinking of the polymer to form a porous dry partially crosslinked room temperature water-soluble polymer coating on the surface of the porous substrate;
  g) subjecting the porous dry partially crosslinked room temperature water-soluble polymer coating on the substrate to substantially complete crosslinking by a method selected from the group consisting of heating the solution for a time and at a temperature sufficient to crosslink the porous dry room temperature water soluble polymer coating and allowing the porous dry coating to remain at room temperature for a time and at a temperature sufficient to crosslink the porous dry room temperature water soluble polymer coating wherein the pore size diameter of pores in the porous coating range from about 1 to about 200 nanometers and the porous crosslinked polymer coating has a thickness from about 1 to about 100 microns;
  h) rinsing the porous crosslinked polymer coated substrate to remove any residual one or more crosslinkers and the one or more porogens from the porous cross-linked polymer coated porous substrate.

18. The process of claim 17 wherein step (e) of partially crosslinking the coated solution on the porous substrate is by a method selected from the group consisting of heating the solution for a time and at a temperature sufficient to partially crosslink the room temperature water soluble polymer solution and allowing the coating to remain at room temperature for a time and at a temperature sufficient to partially crosslink the room temperature water soluble polymer solution.

19. A method of forming a porous crosslinked polymer coated substrate comprising the steps of:
  a) providing one or more room temperature water soluble polymer materials, a solvent for the room temperature water soluble polymer, one or more crosslinking agents selected from the group consisting of multifunctional epoxy compounds, multifunctional bromyl compounds, multifunctional halides, multifunctional aldehydes, bis (2-hydroxy ethyl)sulfone, dimethyldichloro-silane, dimethylolurea, dimethylol ethylene urea, diisocyanates, polyisocyanates and mixtures thereof for the room temperature water soluble polymer, and a porous substrate;
  b) adding the room temperature water soluble polymer, solvent and one or more crosslinking agents together as a mixture;
  c) stirring the mixture for period of time sufficient to dissolve all the components and form a room temperature water soluble polymer solution,
  d) applying the room temperature water soluble polymer solution onto the porous substrate;
  e) evaporating the solvent from the room temperature water soluble polymer solution on the substrate below the temperature at which the cross linking agent causes crosslinking of the polymer materials to form a porous dry room temperature water soluble polymer coating on the substrate;
  f) heating the porous dry room temperature water soluble polymer coating at a temperature of about 70° to 95° C. causing the cross linking agent to crosslink the water soluble polymer coating on the substrate, resulting in a porous cross-linked polymer coated substrate;
  g) rinsing the porous crosslinked polymer coated substrate to remove any residual one or more crosslinking agents from the crosslinked polymer coated structure; and
  h) subjecting the coated substrate to additional processing steps of surface attachment of one or more chemistries.

20. The method of claim 19 further comprising a step between (c) and (d) of causing the partial crosslinking of the coating solution by a method selected from the group consisting of heating the solution for a time and at a temperature sufficient to partially crosslink the room temperature water soluble polymer solution and allowing the coating to remain at room temperature for a time and at a temperature sufficient to partially crosslink the room temperature water soluble polymer solution.

21. The method of claim 19 wherein one or more porogens are added to the solution in step (b), the one or more porogens being selected from the group consisting of polyvinyl pyrrolidone, polyvinyl alcohols, polyethylene glycols, polyacrylamides, substituted polyacrylamides and mixtures thereof.

22. The method of claim 19 wherein the solvent for the room temperature water soluble polymer is selected from the group consisting of water and aqueous solutions, and the room temperature water soluble polymer is selected from the group consisting dextran, celluloses, and agaroses.

* * * * *